May 27, 1941.   F. J. TARRIS   2,243,229
VEHICLE BRAKE
Filed July 1, 1937   2 Sheets-Sheet 1
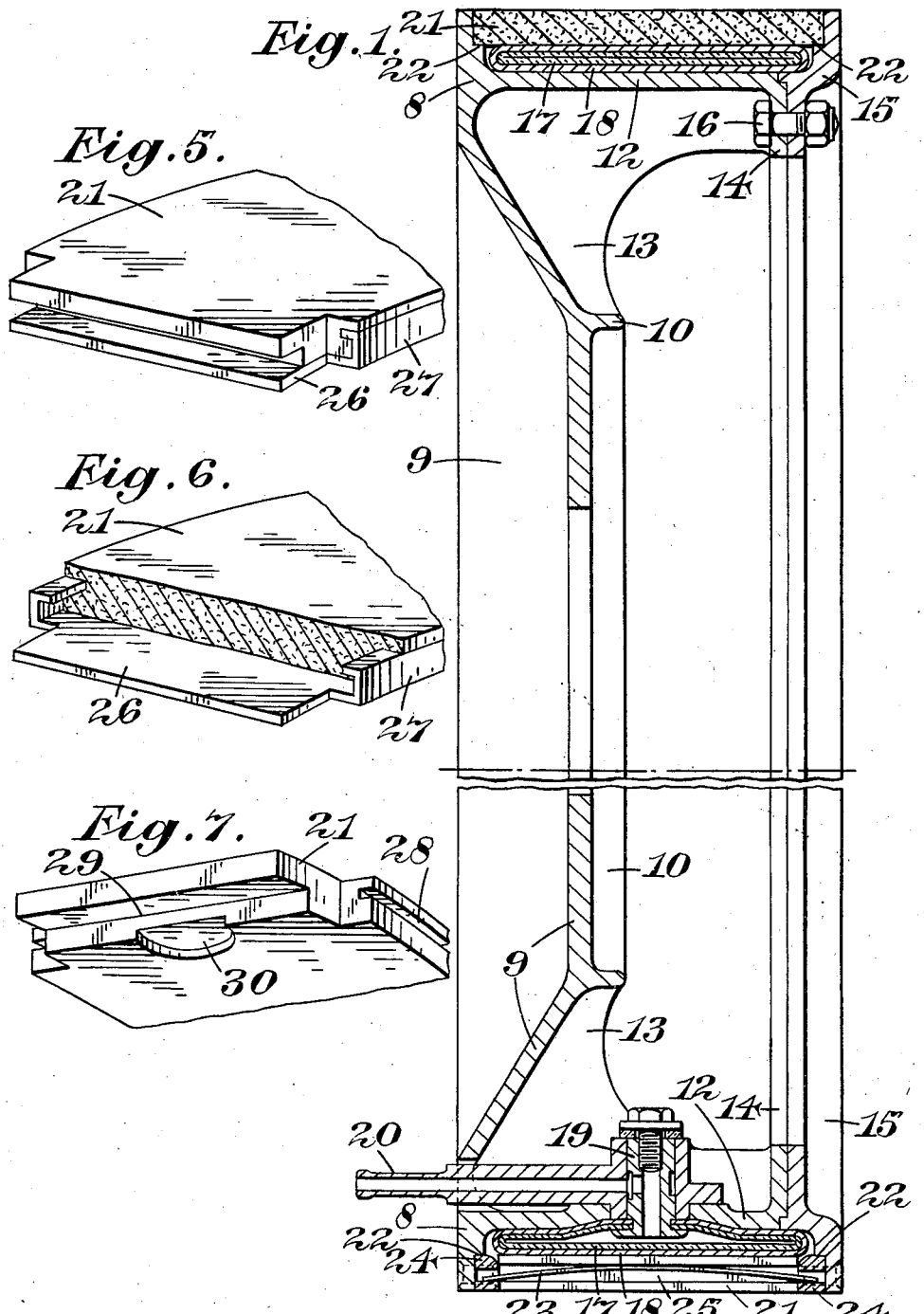

May 27, 1941.  F. J. TARRIS  2,243,229
VEHICLE BRAKE
Filed July 1, 1937   2 Sheets-Sheet 2
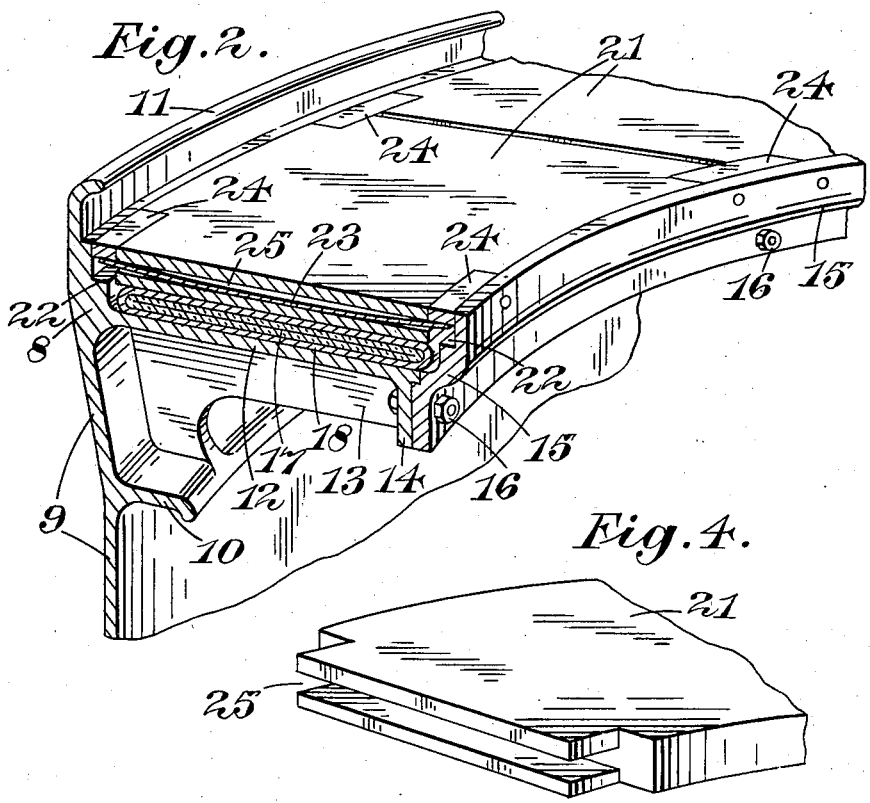
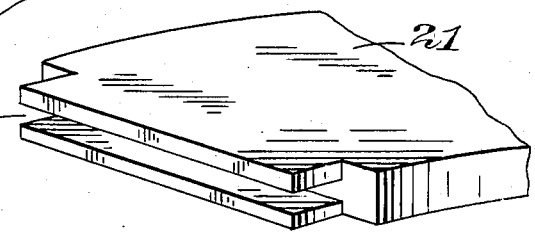
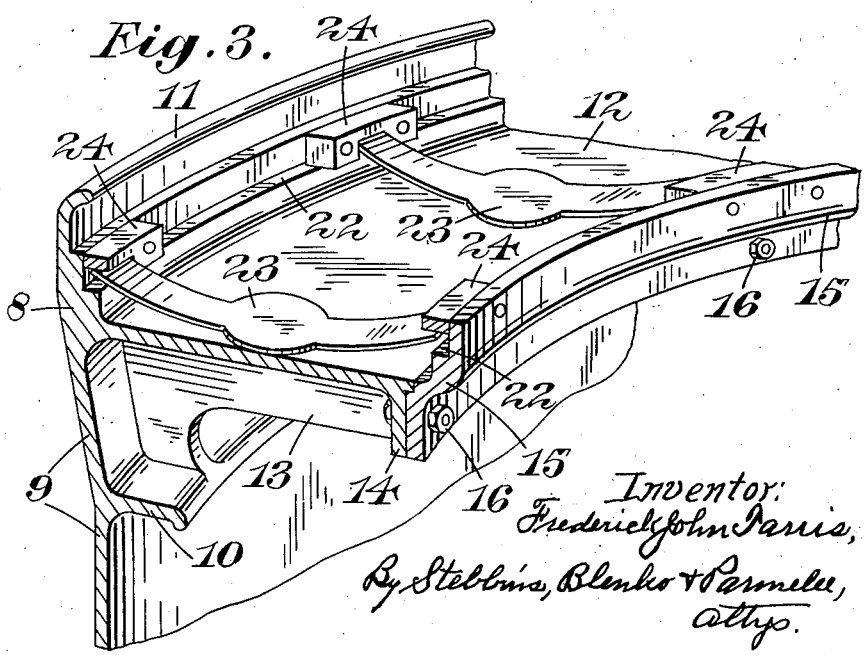
Inventor:
Frederick John Tarris,
By Stebbins, Blenko & Parmelee,
Attys.

Patented May 27, 1941

2,243,229

UNITED STATES PATENT OFFICE 2,243,229

VEHICLE BRAKE

Frederick John Tarris, Silvertown, London, England, assignor to The India Rubber, Gutta Percha and Telegraph Works Company Limited, London, England, a British company Application July 1, 1937, Serial No. 151,489
In Great Britain July 3, 1936

7 Claims. (Cl. 188—152)

The present invention comprises improvements in or relating to vehicle brakes and relates more particularly to brakes intended for use with the landing wheels of aircraft. The invention is, however, capable of employment in the braking mechanism of any other wheeled vehicle, and is applicable to a form of brake mechanism comprising a tubular member capable of expansion and contraction under the action of fluid pressure to produce movement of one or more friction elements mounted together with the tubular member within a supporting member having the form of a trough, said movement serving to apply or release the brake mechanism by establishing or disestablishing frictional contact between the aforesaid friction element or elements and one or more co-operating members, such as a brake drum. This form of brake mechanism will be referred to hereinafter in the present specification as a "vehicle brake mechanism of the type described."

It has already been proposed in prior forms of construction of a vehicle brake mechanism of the type described, to employ resilient spring parts for effecting a return movement of friction elements to an inoperative position after they have been moved by the action of an expansible tubular member to apply the brake.

The present invention provides in or for a vehicle brake of the type described, the combination with the tubular member, the friction element or elements moved thereby and the supporting trough, of a plurality of resilient spring parts which are located wholly within the supporting trough in spaced relation along the length of the tube and which are such as to exert a spring pressure for the purpose described on the friction element or elements at about the mid-point considered in a direction transversely of the tube.

The present invention provides also in or for a vehicle brake of the type described, the combination with the tubular member, the friction element or elements moved thereby and the supporting trough, of a plurality of resilient spring parts which are located in spaced relation along the length of the tube and tend normally to retain the tube and friction elements in an inoperative condition and which are arranged to extend transversely of the supporting trough and have their ends located and retained at the side walls of the trough or by members secured thereto.

Preferably, the resilient spring parts directly engage the friction element or elements which move upon operation of the expansible tubular member and are preferably also provided with transverse slots in which strip or single leaf springs constituting the resilient spring parts are located.

As will be more readily understood hereinafter the resilient spring parts are deformed upon operation of the brake mechanism and they serve positively to return the friction element or elements together with the expansible tubular member to the normal inoperative position upon release of the braking pressure. It will also be understood that the spring pressure exerted on the friction element or elements by the resilient spring parts is for the purpose of helping to counteract the increase of pressure at about the mid point considered in a direction transversely of the expansible tube when the latter is inflated due to the circular shaping of the tube.

In order that the invention may be more clearly understood, preferred constructional examples for use in combination with aircraft wheels will be described with reference to the accompanying drawings, in which—

Figure 1 is a central diametrical section through an assembly embodying the invention and suitable for location within a cylindrical brake drum, Figure 2 is a view in perspective of part of an assembly similar to that shown in Figure 1 but with a modified form of supporting trough, Figure 3 is a view in perspective of the apparatus shown in Figure 2 with the friction elements removed, Figure 4 is a view in perspective of the end portion of one form of friction element, Figure 5 is a view similar to Figure 4 of a modified form of friction element, Figure 6 is a view of the portion of friction element shown in Figure 5 with some of the friction material removed, and Figure 7 is an under view in perspective of the end portion of the friction material employed in the friction element shown in Figure 5.

Like reference numerals are employed to denote like parts in the several figures of the drawings.

The assembly shown in Figure 1 comprises a circular supporting trough 8 having the open end of the trough facing radially outwardly. The trough 8 is of aluminium or other light metal such as "Duralumin." This trough is intended to be mounted rigidly with the frame of the aircraft or with the axle upon which the aircraft wheel rotates, and the total assembly will normally be enclosed by a cylindrical brake drum. The supporting trough 8 is formed below its base with an inwardly-extending annular flange 9 enabling the trough to be mounted in position. The flange 9 conveniently carries on its inner surface a circular projection or ridge 10 located beneath the base of the supporting trough 8 for the purpose of preventing grease from running down from the axle of the wheel to the brake mechanism. In the case of the supporting trough 8 shown in Figures 2 and 3, the outer side wall of the trough 10 is also extended to form a flange 11 serving to exclude mud and water from the brake mechanism when the vehicle provided with the mechanism is in use. The trough 8, as shown in each of Figures 1 to 3, has a base 12 reinforced by ribs 13 extending from the grease-guard 10 to a flange 14 extending radially inwardly from the free inner edge of the base 12. The inner side wall 15 of the trough 8 is formed as a detachable ring secured to the flange 14 by means of bolts 16.

A flattened rubber tube 17, preferably covered with fabric as at 18, is supported with one flattened surface of the tube in contact with the inner surface of the base 12 of the supporting trough. The tube is in the form of an endless ring and a pipe connection 19 is provided to pass through the base 12 of the trough 8 and communicate with the interior of the rubber tube 17. An adaptor 20 is conveniently associated with the pipe connection 19 for enabling the latter to be connected to a fluid pressure supply.

The outer cylindrical surface of the flattened rubber tube is in contact with the undersides of a series of small friction elements 21 which are pressed outwardly into contact with the internal surface of a brake drum when the tube 17 is inflated by fluid pressure passed through the adaptor 20 and pipe connection 19. The friction elements 21 are formed of any preferred material, for example fibrous and coarsely woven material impregnated with a synthetic resin. The side walls of the supporting trough 8 are stepped at 22 to form a seating for the friction elements 21 when they are in their inoperative position. The friction elements 21 are held in position by means of resilient spring parts 23 which are in the form of strip or single leaf springs.

The single leaf springs 23 extend transversely of the supporting trough 8 and have their ends located in cut-away portions of locating blocks 24 secured to the inner surface of the side walls of the supporting trough 8. The cut-away portions of the locating blocks 24 afford recesses for the ends of the resilient parts 23 along the inner surfaces of the side walls of the supporting trough 8, and said cut-away portions are provided along the lower edges of the locating blocks so that the latter straddle the ends of the spring parts 23 to prevent outward movement of said ends.

The friction elements 21 are in the form of rectangular tablets curved to the circular shape of the supporting trough 8 and enclosing brake drum (not shown), the corners of the tablets being cut away as seen more clearly from Figures 4 to 7 to form lateral recesses which accommodate the locating blocks 24. The inwardly projecting blocks 24 thus serve to prevent rotational movement of the friction elements 24 relatively to the supporting trough 8 in a manner similar to one which has already been suggested and in which projections are provided internally of the side walls of the supporting trough to engage the friction elements.

In the present construction adjacent and contiguous edges of successive friction elements 21 are transversely slotted between their cut-away corners to form recesses or slots 25 extending transversely across the ends of the blocks. See Figure 4. The sides of the slots 25 are substantially parallel to the friction face of the elements 21 and the resilient spring parts 23 are housed in the slots. With this arrangement it is possible for each resilient spring part 23 to engage a pair of successive friction elements 21 so that the latter are subjected to the action of the spring parts 23 at each end of each element. The resilient spring parts 23 are conveniently enlarged laterally at their mid portions and the slots in the friction elements may be shaped internally to receive such enlargement.

When the brake is to be applied, liquid or gas pressure is allowed to pass through the adaptor 20 and the pipe connection 19 into the rubber tube 17 which moves somewhat out of its flattened condition and presses the friction elements 21 radially outwardly against the friction lining of the brake drum. This movement of the friction elements 21 and of the rubber tube 17 is accompanied by deformation of each of the spring parts 23 at least one end of each of which is located freely within the cut-away portion of the locating blocks 24 securing the springs 23 in place. The transverse leaf springs 23 apply restraining spring pressure at the mid portion of the friction elements 21 considered in a direction transversely of the trough 8 and of the expansible tube 17. This spring pressure helps to counteract a tendency for excess pressure at the mid point due to the circular shaping of the expansible tube. The spring parts 23 also serve positively to bring the friction elements 21 back to their inoperative position and the tube 17 to its flattened condition when the brakes are released by releasing the fluid pressure supply. It is to be noted that direct engagement between the transverse leaf springs 23 and the friction elements 21 is obtained with the construction described above, and there is no necessity for rivets to be driven through the friction material in order to secure the friction elements 21 in position. Further, it is to be noted also that the resilient spring parts 23 are wholly located within the supporting trough 8 and are in fact totally enclosed by the trough 8 and by the friction elements 21.

Further modification of the forms of constructions which have been described may be made for example by providing a metal base for each friction element 21 as shown in Figures 5 to 7. This metal base for the friction material is seen at 26 and is of substantially rectangular form with its corners cut away to accommodate the locating blocks 24. Upstanding side flanges 27 of U-form serve to secure the metal base to the friction material of the friction element 21, the final arm of the U taking into a groove 28 provided along the side edge of the friction material which is shown in Figure 7 removed from the metal base 26. Adjacent end edges of the friction elements afford the necessary slots to accommodate the resilient spring parts 23, the upper walls of the slots being provided by a cut-away portion 29 of the friction material as seen in Figure 7. The lower walls of the slots, however, are now provided by adjacent end portions of a pair of metal bases 26. A suitable recess 30 for the central enlarged portion of a leaf spring 23 is preferably cut on the under surface of the friction material of each friction element as seen in Figure 7.

It is to be understood that the invention is also applicable to vehicle brakes operated by means of a vacuum, which form of brakes is intended to be included in the term "vehicle brake mechanism of the type described" employed in the present specification and referring to brakes comprising a member expansible or deformable under the action of fluid pressure. This fluid pressure may clearly be a positive pressure but is in the case of vacuum-operated brakes atmospheric pressure.

I claim:

1. For use in a vehicle brake or like frictionally engageable structure comprising a friction surface, the combination of an annular supporting trough, an expansible tube located therein, a plurality of relatively thin friction blocks located in the trough end to end circumferentially thereof between said expansible tube and the friction surface, the said blocks having lateral recesses at their ends, retracting leaf springs each extending transversely of the trough and situated between adjacent friction blocks, and projections which extend inwardly from and at spaced intervals along the side wall of the trough and engage within said lateral recesses in the blocks.

2. For use in a vehicle brake or like frictionally engageable structure comprising a friction surface, the combination of elements in accordance with claim 1, in which the projections which extend inwardly from the side wall of the trough are themselves provided with recesses to receive the ends of the leaf springs.

3. For use in a vehicle brake or like frictionally engageable structure comprising a friction surface, the combination of elements according to claim 1 in which the ends of the friction blocks are formed with recesses extending transversely of the blocks for the reception within the recesses of part at least of an associated leaf spring.

4. For use in a vehicle brake or like frictionally engageable structure comprising a friction surface, the combination of elements according to claim 1 in which each friction block at each end has a transverse slot extending across its width and in the combined slots of adjacent ends of two neighbouring friction blocks a single leaf spring is substantially completely housed.

5. For use in a vehicle brake or like frictionally engageable structure comprising a friction surface, the combination of elements according to claim 1 in which each friction block comprises a metal base having friction material carried on the outer side thereof and the metal base forms at least one wall of the transverse slot in which the leaf spring is received.

6. For use in a vehicle brake or like frictionally engageable structure comprising a friction surface, the combination of elements according to claim 1 in which each leaf spring is in the form of a strip having an enlarged mid portion and is so curved that when the extensible tube is deflated the enlarged mid portion of each spring bears substantially alone against the friction blocks with which it cooperates at a transverse mid position of the blocks.

7. For use in a vehicle brake or like frictionally engageable structure comprising a friction surface, the combination of elements according to claim 1 in which each leaf spring has a mid portion formed with an enlargement extending on each side of the spring circumferentially of the trough, and each friction block in addition to the transverse slot within which an associated leaf spring is accommodated, is formed with a recess shaped to receive within it a corresponding portion of the enlarged part of the spring.

FREDERICK JOHN TARRIS.